(12) United States Patent
Scaba

(10) Patent No.: US 9,603,341 B2
(45) Date of Patent: Mar. 28, 2017

(54) DOG LEASH HAVING INTELLIGENT LIGHTING TO IMPROVE SAFETY

(71) Applicant: Steven Scaba, New York, NY (US)

(72) Inventor: Steven Scaba, New York, NY (US)

( * ) Notice: Subject to any disclaimer, the term of this patent is extended or adjusted under 35 U.S.C. 154(b) by 204 days.

(21) Appl. No.: 14/558,748

(22) Filed: Dec. 3, 2014

(65) Prior Publication Data

US 2016/0157466 A1  Jun. 9, 2016

(51) Int. Cl.
*A01K 27/00* (2006.01)
*H05B 37/02* (2006.01)

(52) U.S. Cl.
CPC .......... *A01K 27/006* (2013.01); *A01K 27/004* (2013.01); *A01K 27/009* (2013.01); *H05B 37/0218* (2013.01); *H05B 37/0227* (2013.01)

(58) Field of Classification Search
CPC .. A01K 27/006; A01K 27/004; A01K 27/009; A01K 27/003; H05B 37/0218; H05B 37/0227
See application file for complete search history.

(56) References Cited

U.S. PATENT DOCUMENTS

| | | | | |
|---|---|---|---|---|
| 5,950,571 A * | 9/1999 | Schade | ................ | A01K 27/006 119/859 |
| 6,047,664 A * | 4/2000 | Lyerly | ................... | A01K 15/021 119/719 |
| 6,374,778 B1 * | 4/2002 | Glussich | ............... | A01K 27/006 119/859 |
| 6,557,498 B1 * | 5/2003 | Smierciak | ............ | A01K 27/006 119/858 |
| 2005/0217611 A1 * | 10/2005 | Morehead | ............ | A01K 27/006 119/859 |
| 2008/0168952 A1 * | 7/2008 | Morehead | ............ | A01K 27/006 119/859 |
| 2010/0302767 A1 * | 12/2010 | Mattheis | ................. | F21L 4/027 362/184 |
| 2011/0120389 A1 * | 5/2011 | Yackley | ................... | A01K 1/04 119/796 |
| 2011/0220036 A1 * | 9/2011 | Matthews | ............ | A01K 27/004 119/796 |
| 2013/0327280 A1 * | 12/2013 | Thalmann | ............ | A01K 27/009 119/719 |
| 2014/0000533 A1 * | 1/2014 | Limberis | ............... | A01K 27/006 119/796 |
| 2015/0359197 A1 * | 12/2015 | Crucs | ................... | A01K 27/004 119/719 |

\* cited by examiner

*Primary Examiner* — Kathleen Alker
(74) *Attorney, Agent, or Firm* — Raj Abhyanker, P.C.

(57) ABSTRACT

Disclosed is a dog leash having intelligent lighting to improve safety. In one aspect, the dog leash includes a central cavity holding a retractable leash and an extension sensor to detect when the retractable leash is extended beyond a threshold distance. The dog leash also includes an ambient light sensor to detect a surrounding light intensity. In addition, the dog leash includes a set of lights to automatically illuminate a dog being walked by a walker, a perpendicular area, and/or the walker themselves when the extension sensor detects that a leash is extended beyond the threshold distance when the ambient light sensor detects that a surrounding ambient light is below a threshold value using a processor and a memory of the dog leash.

20 Claims, 7 Drawing Sheets

DOG LEASH HAVING INTELLIGENT LIGHTING TO IMPROVE SAFETY

FIELD OF THE TECHNOLOGY

This disclosure relates generally to pet leashes, and more particularly to a dog leash with integrated lighting system to enhance the safety of a dog and a dog handler in the low-light conditions.

BACKGROUND

A dog leash may be used to secure, control, and/or restrain a dog being controlled by a walker (e.g., an owner of the dog, a friend of the owner, a professional caretaker). The walker may take the dog for a walk in an urban area in which there is significant vehicular traffic while the dog is wearing the dog leash. For example, the walker may traverse busy intersections and/or roads when walking the dog controlled through the dog leash. In addition, the walker may take the dog out in evening or night hours, when lighting outside is dim (e.g., in evening hours). In such instances, oncoming cars may pose a significant threat to physical safety of both the walker and the dog because they may not see the walker and/or the dog (e.g., while crossing a street).

Further, the dog may express a wide range of emotions while being walked when ambient lighting is dim. For example, the dog may find interest in another dog, may bark at a perceived threat, and/or may be curious about his/her surroundings while being walked when ambient lighting is dim. These emotions may cause the dog to behave in unexpected ways, and in ways that require restraint through the dog leash. Unfortunately, the dog may sometimes overpower the walker causing the walker to enter a busy roadway with automobiles. Even without such behaviors, an oncoming automobile may not see the walker and/or the dog when ambient lighting is dim and may strike the walker and/or the dog. For this reason, it may not be safe both the dog and the walker to walk when ambient lighting is dim.

SUMMARY

Disclosed is a dog leash having intelligent lighting to improve safety.

In one aspect, a dog leash includes a central cavity holding a retractable leash and an extension sensor to detect when the retractable leash is extended beyond a threshold distance. The dog leash also includes an ambient light sensor to detect a surrounding light intensity and a set of lights to automatically illuminate a dog being walked by a walker, a perpendicular area, and/or the walker themselves (e.g., when the extension sensor detects that a leash is extended beyond the threshold distance when the ambient light sensor detects that a surrounding ambient light is below a threshold value) using a processor and a memory of the dog leash.

The threshold distance may be 24 inches and the threshold value may be less than 120 lux (luminous flux per unit area). The set of lights may automatically turn off when the retractable leash has contracted under 12 inches. An agitation sensor may detect when the dog being walked by the walker is agitated. The agitation sensor may be a force sensor, a pressure sensor, a tension sensor, a motion sensor, and/or an auditory sensor. The set of lights may automatically create a pattern to soothe the dog when the dog being walked by the walker is agitated. The pattern may be a strobe pattern, a color pattern, and/or a light therapy pattern.

An auditory microphone of the dog leash may emit a soothing music when the dog being walked is agitated and/or a high pitched alarm when an emergency condition is detected. The emergency condition may be detected when the dog leash is detected to be unpredictably tangled and/or when the walker manually presses a button on the dog leash. A pedometer embedded within the dog leash may be communicatively coupled with the processor and the memory to capture a data to track a walked distance, a calories burned, a steps taken, and/or a time of day walked. The pedometer may wirelessly communicate the data to a mobile device of the walker when the dog leash is paired with the mobile device of the walker. A battery compartment of the dog leash may house a rechargeable battery and/or an alkaline battery and may include a key chain holder on a top face of the battery compartment.

In another aspect, a dog leash includes a central cavity holding a retractable leash. The dog leash also includes an extension sensor to detect when the retractable leash is extended beyond a threshold distance and an ambient light sensor to detect a surrounding light intensity. Further, the dog leash includes a set of lights to automatically illuminate a dog being walked by a walker, a perpendicular area, and/or the walker themselves (e.g., when the extension sensor detects that a leash is extended beyond the threshold distance when the ambient light sensor detects that a surrounding ambient light is below a threshold value) using a processor and a memory of the dog leash. In addition, the dog leash includes an agitation sensor to detect when the dog being walked by the walker is agitated. The agitation sensor is a force sensor, a pressure sensor, a tension sensor, a motion sensor, and/or an auditory sensor.

In yet another aspect, a dog leash includes a central cavity holding a retractable leash and an extension sensor to detect when the retractable leash is extended beyond a threshold distance. The dog leash also includes an ambient light sensor to detect a surrounding light intensity. In addition, the dog leash includes a set of lights to automatically illuminate a dog being walked by a walker, a perpendicular area, and/or the walker themselves (e.g., when the extension sensor detects that a leash is extended beyond the threshold distance when the ambient light sensor detects that a surrounding ambient light is below a threshold value) using a processor and a memory of the dog leash.

Further, the dog leash includes an agitation sensor to detect when the dog being walked by the walker is agitated. The agitation sensor is a force sensor, a pressure sensor, a tension sensor, a motion sensor, and/or an auditory sensor. An auditory microphone of the dog leash emits a soothing music when the dog being walked is agitated and/or a high pitched alarm when an emergency condition is detected. The emergency condition is detected when the dog leash is detected to be unpredictably tangled and/or when the walker manually presses a button on the dog leash.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Figure 1A:
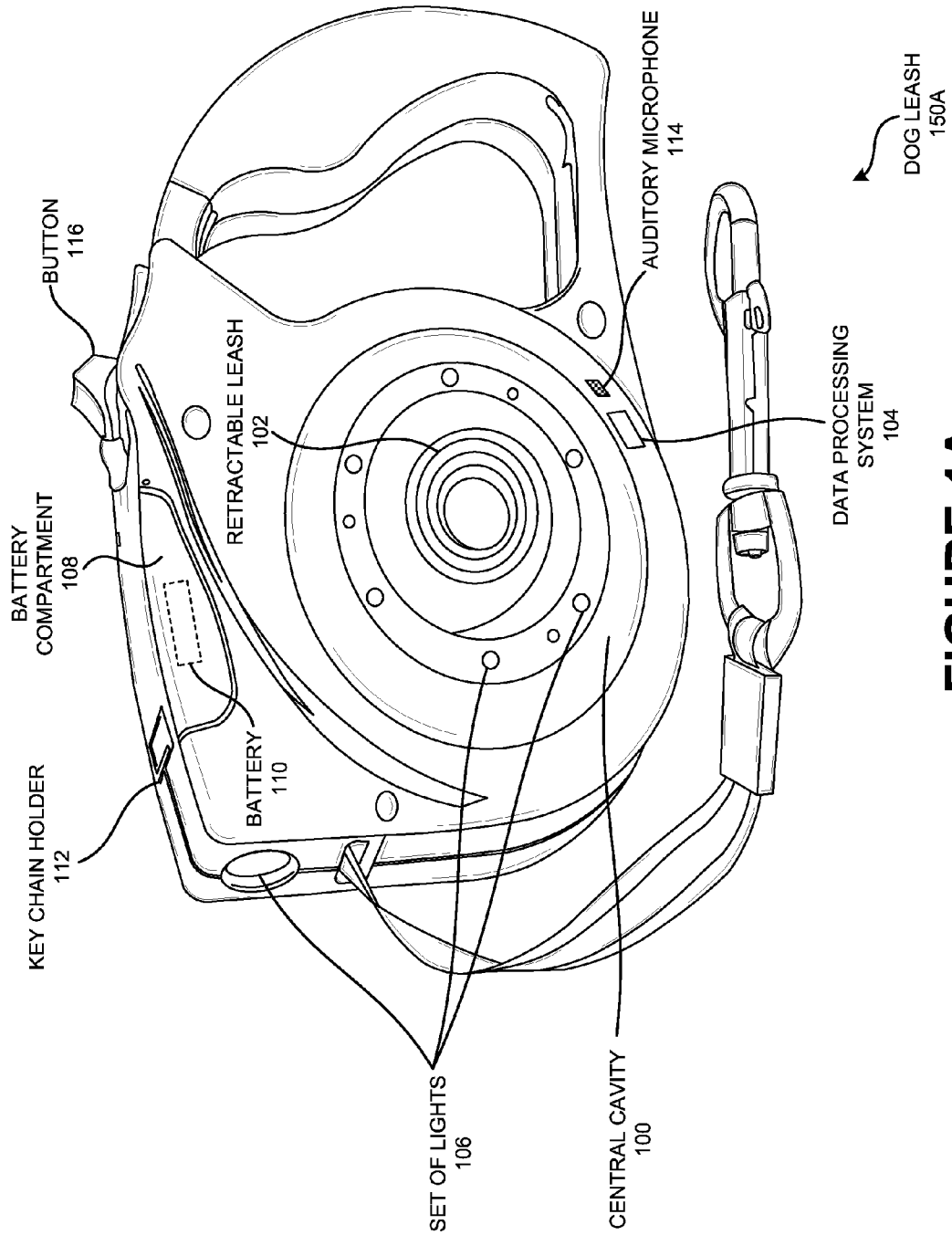
FIG. 1A is a schematic view of a dog leash, according to one embodiment.

Other features of the present embodiments will be apparent from the accompanying drawings and from the detailed description that follows.

DETAILED DESCRIPTION

Disclosed is a dog leash having intelligent lighting to improve safety, according to one embodiment.

In one embodiment, a dog leash 150A includes a central cavity 100 holding a retractable leash 102 and an extension sensor 124 to detect when the retractable leash 102 is extended beyond a threshold distance 208. The dog leash 150A also includes an ambient light sensor 126 to detect a surrounding light intensity and a set of lights 106 to automatically illuminate a dog 204 being walked by a walker 202, a perpendicular area 206, and/or the walker 202 themselves (e.g., when the extension sensor 124 detects that a leash is extended beyond the threshold distance 208 when the ambient light sensor 126 detects that a surrounding ambient light is below a threshold value) using a processor 118 and a memory 120 of the dog leash 150A.

The threshold distance 208 may be 24 inches and the threshold value may be less than 120 lux (luminous flux per unit area). The set of lights 106 may automatically turn off when the retractable leash 102 has contracted under 12 inches. An agitation sensor 128 may detect when the dog 204 being walked by the walker 202 is agitated. The agitation sensor 128 may be a force sensor, a pressure sensor, a tension sensor, a motion sensor, and/or an auditory sensor. The set of lights 106 may automatically create a pattern 402 to soothe the dog 204 when the dog 204 being walked by the walker 202 is agitated. The pattern 402 may be a strobe pattern, a color pattern, and/or a light therapy pattern.

An auditory microphone 114 of the dog leash 150A may emit a soothing music when the dog 204 being walked is agitated and/or a high pitched alarm when an emergency condition is detected. The emergency condition may be detected when the dog leash 150A is detected to be unpredictably tangled and/or when the walker 202 manually presses a button 116 on the dog leash 150A. A pedometer 130 embedded within the dog leash 150A may be communicatively coupled with the processor 118 and the memory 120 to capture a data to track a walked distance, a calories burned, a steps taken, and/or a time of day walked. The pedometer 130 may wirelessly communicate the data to a mobile device 406 of the walker 202 when the dog leash 150A is paired with the mobile device 406 of the walker 202. A battery compartment 108 of the dog leash 150A may house a rechargeable battery and/or an alkaline battery and may include a key chain holder 112 on a top face of the battery compartment 108.

In another embodiment, a dog leash 150A includes a central cavity 100 holding a retractable leash 102. The dog leash 150A also includes an extension sensor 124 to detect when the retractable leash 102 is extended beyond a threshold distance 208 and an ambient light sensor 126 to detect a surrounding light intensity. Further, the dog leash 150A includes a set of lights 106 to automatically illuminate a dog 204 being walked by a walker 202, a perpendicular area 206, and/or the walker 202 themselves (e.g., when the extension sensor 124 detects that a leash is extended beyond the threshold distance 208 when the ambient light sensor 126 detects that a surrounding ambient light is below a threshold value) using a processor 118 and a memory 120 of the dog leash 150A. In addition, the dog leash 150A includes an agitation sensor 128 to detect when the dog 204 being walked by the walker 202 is agitated. The agitation sensor 128 is a force sensor, a pressure sensor, a tension sensor, a motion sensor, and/or an auditory sensor.

In yet another embodiment, a dog leash 150A includes a central cavity 100 holding a retractable leash 102 and an extension sensor 124 to detect when the retractable leash 102 is extended beyond a threshold distance 208. The dog leash 150A also includes an ambient light sensor 126 to detect a surrounding light intensity. In addition, the dog leash 150A includes a set of lights 106 to automatically illuminate a dog 204 being walked by a walker 202, a perpendicular area 206, and/or the walker 202 themselves (e.g., when the extension sensor 124 detects that a leash is extended beyond the threshold distance 208 when the ambient light sensor 126 detects that a surrounding ambient light is below a threshold value) using a processor 118 and a memory 120 of the dog leash 150A.

Further, the dog leash 150A includes an agitation sensor 128 to detect when the dog 204 being walked by the walker 202 is agitated. The agitation sensor 128 is a force sensor, a pressure sensor, a tension sensor, a motion sensor, and/or an auditory sensor. An auditory microphone 114 of the dog leash 150A emits a soothing music when the dog 204 being walked is agitated and/or a high pitched alarm when an emergency condition is detected. The emergency condition is detected when the dog leash 150A is detected to be unpredictably tangled and/or when the walker 202 manually presses a button 116 on the dog leash 150A.

FIG. 1A is a schematic view of a dog leash 150A, according to one embodiment. Particularly, the dog leash 150A shows a central cavity 100, a retractable leash 102, a data processing system 104, a set of lights 106, a battery compartment 108, a battery 110, a key chain holder 112, an auditory microphone 114 and a button 116, according to one embodiment. The central cavity 100 may be a hollow area or a hole that holds the retractable leash 102. The retractable leash 102 may be a long rope or chain attached to the neck of the dog 204 for restraint that can be pulled back, according to one embodiment.

In one embodiment, the data processing system 104 may be a collaboration of machines that perform operations on input data to transform it into the output. The output may be in the form of audio/video, graphic, numeric, and/or text as desired by the walker 202. The set of lights 106 may include the lights in the central cavity 100 (e.g., 4-mode safety LED ring 302) and/or the high intensity LED flashlight 300 powered by the battery 110 and activated by the button 116 that helps the walker 202 while walking a dog 204 at night and/or in the evening hours when the ambient light is dim, according to one embodiment.

The battery compartment 108 may be a chamber that holds the battery 110. A battery 110 (e.g., a rechargeable battery, an alkaline battery) may be a source of power that illuminates the set of lights 106 and/or switches on the auditory microphone 114, according to one embodiment. The key chain holder 112 on the top surface of the battery compartment 108 may be used to secure the key chain, according to one embodiment.

In one embodiment, the auditory microphone 114 may be a device which produces an audio output in the form of sound waves. The walker 202 may record a track (e.g., a tune, a melody, a soothing music) in the auditory microphone 114 and replay them when the dog 204 is agitated, according to one embodiment. The auditory microphone 114 may also produce an alarm (e.g., a high pitched alarm, alert tone) when an emergency condition is noticed. The emergency condition may occur when the retractable cord of the dog leash 150A is found to be unpredictably twisted and/or when the walker 202 manually presses the button 116 on the dog leash 150A, according to one embodiment.

The button 116 located near the handle (e.g., rubberized comfort handle 306) may be used to activate and/or deactivate the set of lights 106 and/or to notify about the emergency condition, according to one embodiment.

Figure 1B:
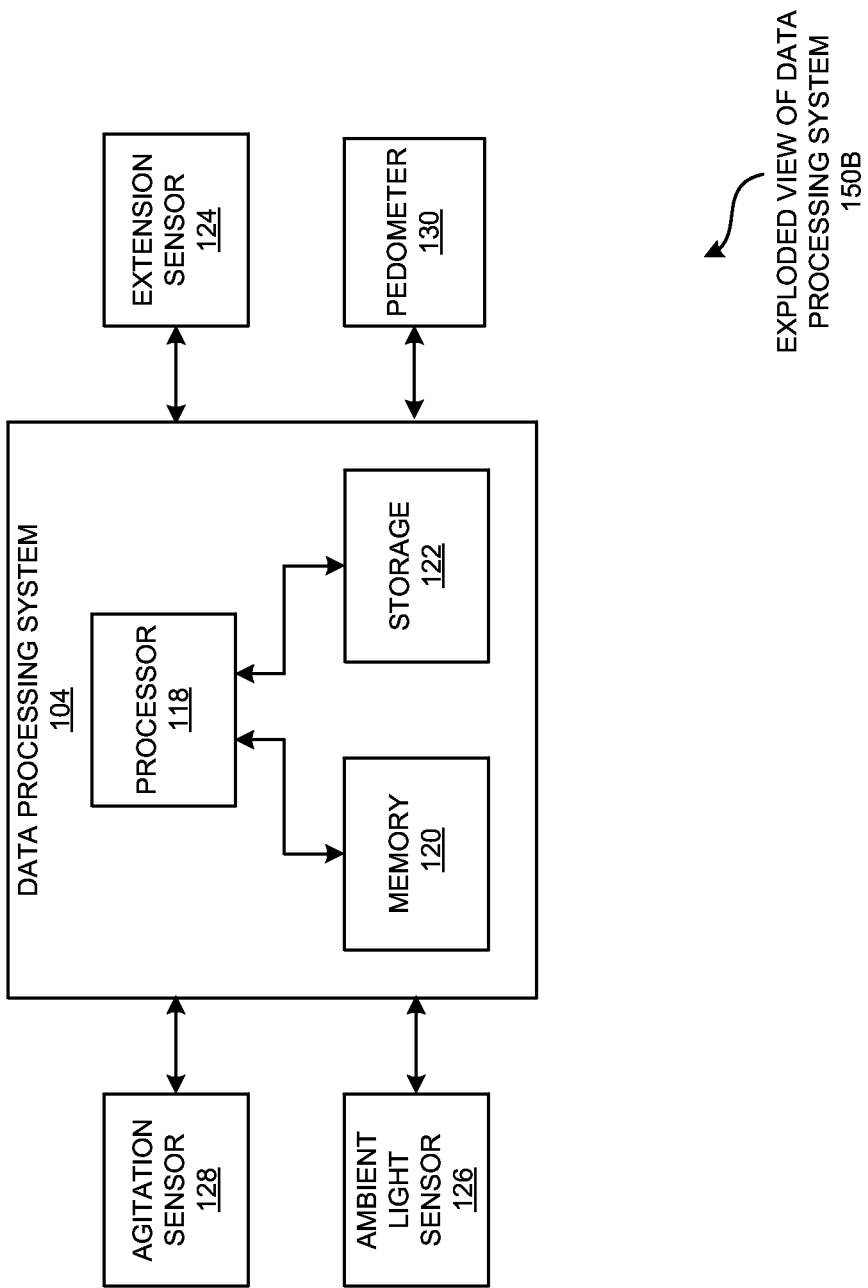
FIG. 1B is an exploded view of a data processing system of FIG. 1A, according to one embodiment.

FIG. 1B is an exploded view of a data processing system 104 of FIG. 1A. Particularly, FIG. 1B illustrates a processor 118, a memory 120, storage 122, an extension sensor 124, an ambient light sensor 126, an agitation sensor 128 and a pedometer 130, according to one embodiment. In one embodiment, the processor 118 may be a central unit of the data processing system 104 that performs all the basic operations and/or executes the instructions stored in the memory 120. The memory 120 may store data and instructions required by the processor 118. The storage 122 may accumulate information in the form of audio and/or voice recordings (e.g., a tune, a melody, a soothing music, a high pitched alarm, alert tone), according to one embodiment.

In one embodiment, the extension sensor 124 may detect the stretching of the retractable leash 102 beyond the threshold distance 208. The threshold distance 208 may be 24 inches, according to one embodiment. The ambient light sensor 126 may detect the amount of light in the environment and helps the processor 118 to determine the amount of illumination required depending upon the ambient light, according to one embodiment. The agitation sensor 128 (e.g., a force sensor, a pressure sensor, a tension sensor, a motion sensor, and/or an auditory sensor) may be used to detect the unnatural behavior of the dog 204, according to one embodiment. The pedometer 130 embedded within the dog leash 150A may notify a data (e.g., walked distance, a calories burned, a steps taken, and/or a time of day) wirelessly to the mobile device 406 of the walker 202, according to one embodiment.

FIG. 1B illustrates a data processing system 104 including a processor 118 coupled with a memory 120 and a storage 122. The extension sensor 124 and ambient light sensor 126 may be coupled with the data processing system 104. The agitation sensor 128 and pedometer 130 may be communicatively coupled to the data processing system 104, according to one embodiment.

Figure 2:
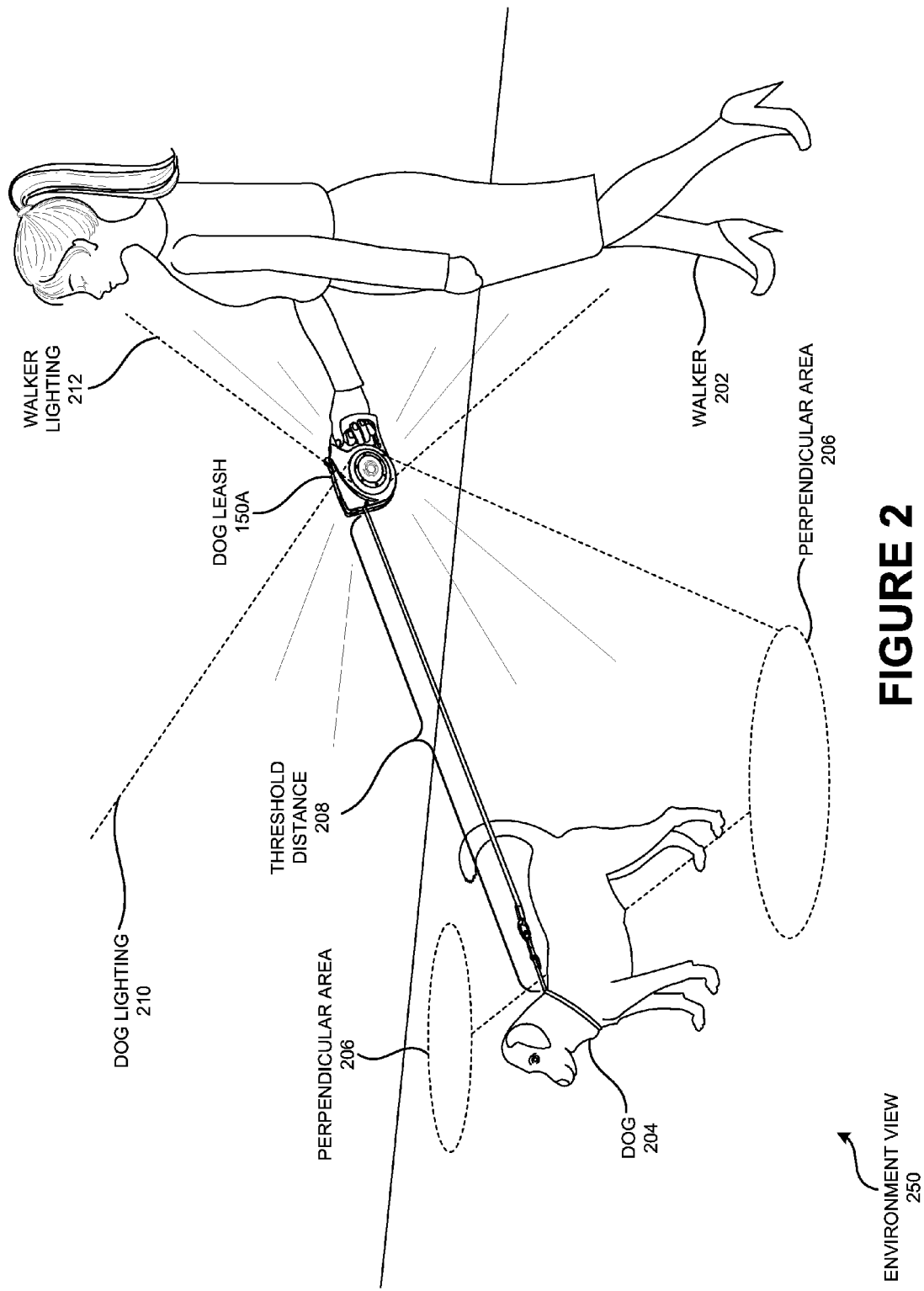
FIG. 2 is an environment view illustrating a perpendicular area illuminated by a set of lights of the dog leash of FIG. 1A, according to one embodiment.

FIG. 2 is an environment view 250 illustrating a perpendicular area 206 and/or walker 202 illuminated by the set of lights 106 of the dog leash 150A of FIG. 1A. Particularly, FIG. 2 illustrates a walker 202, a dog 204, a perpendicular area 206, a threshold distance 208, a dog lighting 210 and a walker lighting 212, according to one embodiment.

The walker 202 may be a person (e.g., a pet lover, a dog owner, a friend of the owner, a professional caretaker) taking the dog 204 for a walk, according to one embodiment. The dog 204 may be a pet animal (e.g., a companion animal) of the walker 202. In one embodiment, the perpendicular area 206 may be a region at the right angles to either sides of the dog 204. The threshold distance 208 may be the defined distance between the dog leash 150A and the dog 204. The threshold distance 208 may be 24 inches, according to one embodiment. The dog lighting 210 may be a wide beam of light projected on the dog 204 and/or perpendicular area 206 through the set of lights 106 of the dog leash 150A. The walker lighting 212 may be a wide beam of light projected on the walker 202 through the set of lights 106 of the dog leash 150A, according to one embodiment.

Figure 3:
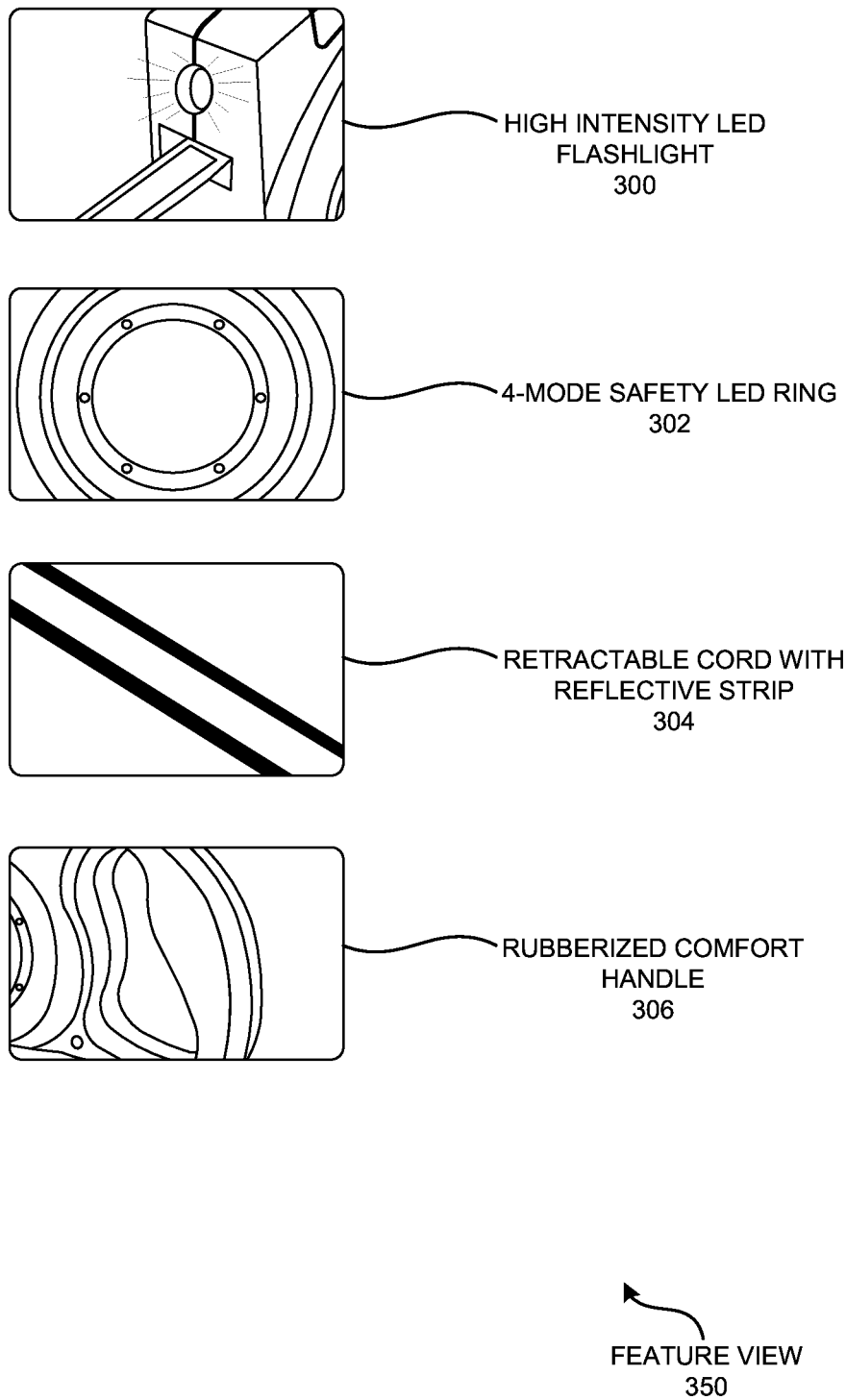
FIG. 3 is a feature view showing various features of the dog leash of FIG. 1A, according to one embodiment.

FIG. 3 is a feature view 350 showing various features of the dog leash 150A of FIG. 1A. Particularly, FIG. 3 shows a high intensity LED flashlight 300, a 4-mode safety LED ring 302, a retractable cord with reflective strip 304 and a rubberized comfort handle 306, according to one embodiment. The high intensity LED flashlight 300 may be a light source providing narrow beam of light expanded uniformly to the larger area (e.g., the perpendicular area 206), according to one embodiment.

The 4-mode safety LED ring 302 may be a circular ring holding Light Emitting Diode (LED) that perfectly fits into the central cavity 100, according to one embodiment. The 4-mode safety LED ring 302 may have four zones that can be controlled separately and/or illumination (e.g., brightness) may be adjusted depending upon the requirements of the pet handler (e.g., walker 202) and/or the ambient light. The LEDs may flash in different colors, at two different speeds, and/or just stay on, according to one embodiment.

The retractable cord with reflective strip 304 may light up the retractable leash 102 and exhibit omnidirectional reflectivity, according to one embodiment. When a light (e.g., car headlights) shines on this material, the entire surface may reflect brightly and provide optimal visibility in the dark and/or low light conditions. A rubberized comfort handle 306 may provide grip to the hands of the walker 202 holding dog leash 150A, according to one embodiment.

Figure 4:
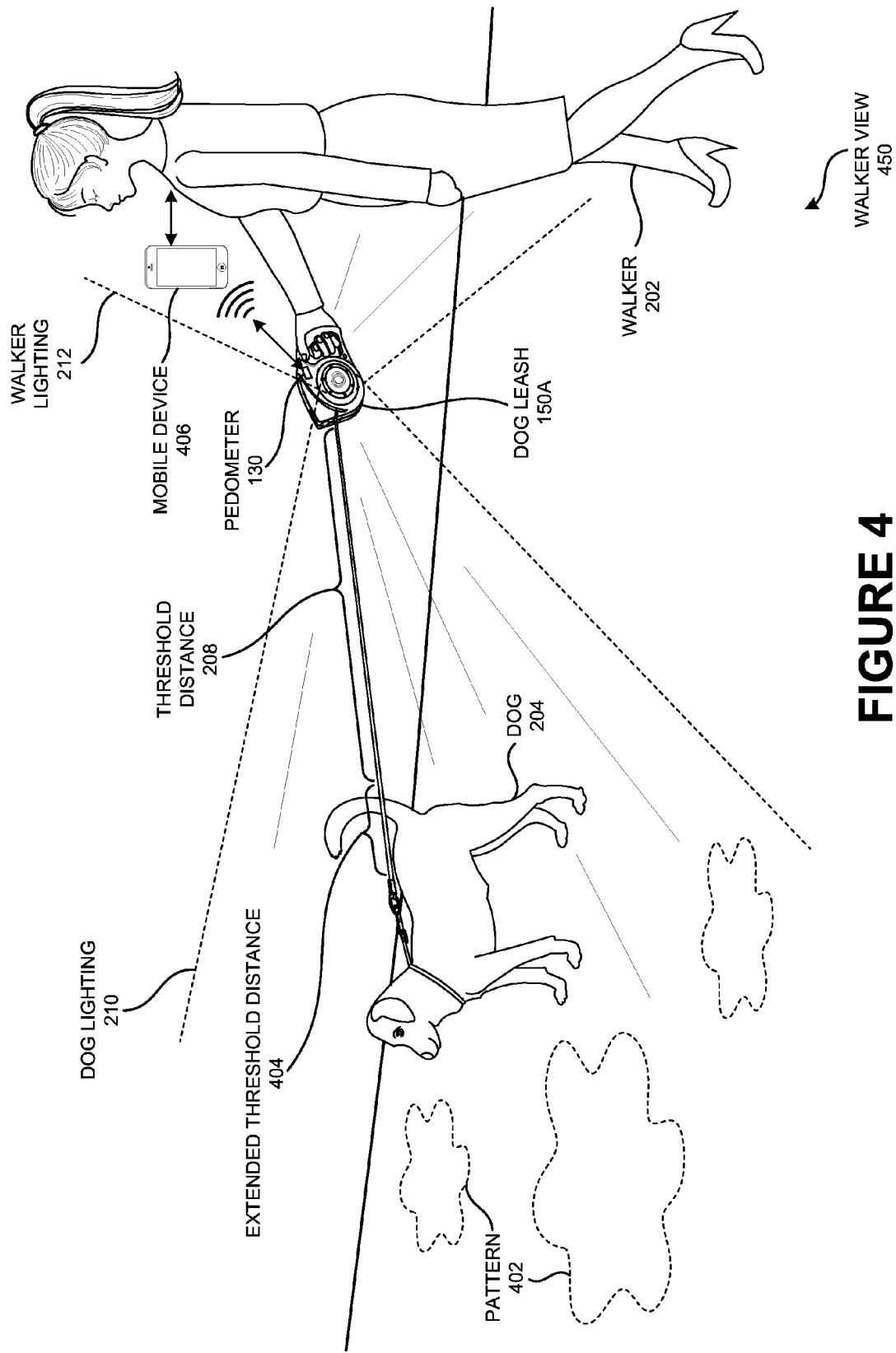
FIG. 4 is walker view illustrating a pattern formed by the set of lights of the dog leash of FIG. 1A, according to one embodiment.

FIG. 4 is walker view 450 illustrating a pattern 402 formed by a set of lights 106 of the dog leash 150A of FIG. 1A. Particularly, FIG. 4 illustrates a pattern 402, an extended threshold distance 404 and a mobile device 406, according to one embodiment. A pattern 402 may be the light formations (e.g., a strobe pattern, a color pattern, and/or a light therapy pattern) formed on the ground (e.g., a road, a path), according to one embodiment. The extended threshold distance 404 may be the stretched distance beyond the defined distance (e.g., the threshold distance 208). The mobile device 406 may be a handheld device (e.g., a smartphone, a tablet) of the walker 202 which receives the notifications wirelessly from the pedometer 130 embedded in the dog leash 150A, according to one embodiment.

Figure 5:
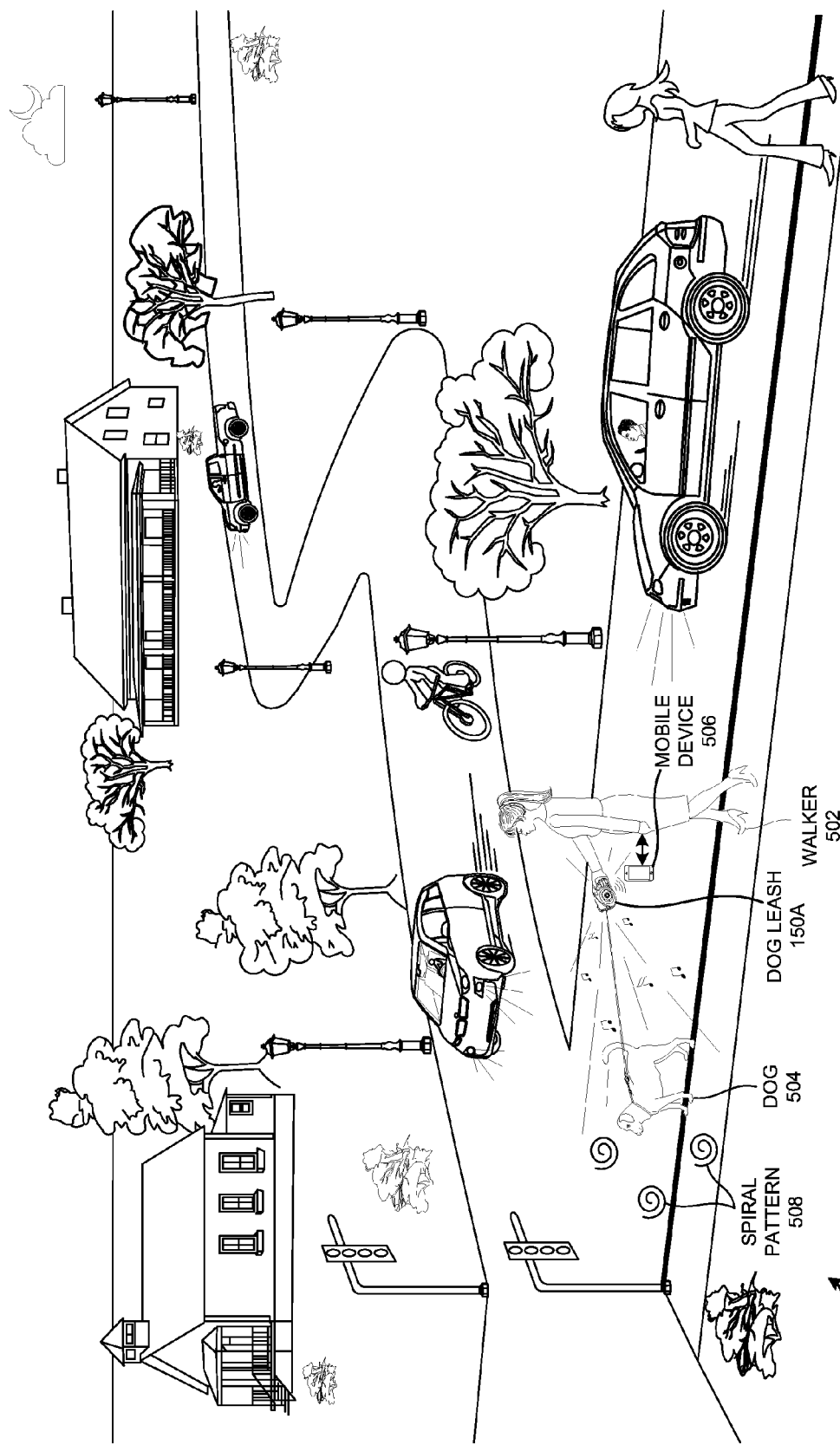
FIG. 5 is a conceptual view showing illumination of the set of lights, the pattern formed, an auditory microphone emitting soothing music and/or an high pitched alarm and a pedometer communicating a data wirelessly to a mobile device in the low-light conditions, according to one embodiment.

FIG. 5 is a conceptual view 550 of a spiral pattern 508 formed in the perpendicular region of the dog 504 in the low-light conditions, according to one embodiment. The walker 502 may take the dog 504 for a walk in the evening hours. Due to the oncoming vehicles on the road, heavy traffic, and/or the poor lighting, the dog 504 may feel agitated and/or behave inappropriately, according to one embodiment. The dog 504 may start running and/or try to enter the busy road. The agitation sensor built in the dog leash 150A may detect the unexpected behavior of the dog 504, according to one embodiment.

The extension sensor in the dog leash 150A may detect the stretching of the retractable leash beyond the threshold distance (e.g., beyond 24 inches), according to one embodiment. The ambient light sensor of the dog leash 150A may recognize the intensity of light below a threshold value (e.g., threshold value may less than 120 lux) in the environment (e.g., an area, a path, a road), according to one embodiment. The set of lights (as described in the FIGS. 1A to 4) may be turned on, according to one embodiment. A spiral pattern 508 of lights (e.g., set of lights 106 as described in the FIG. 1A) may be formed on the ground (e.g., a road, a path) to soothe the dog 504 in the perpendicular region (e.g., a perpendicular area 206 as shown in the FIG. 2 and FIG. 4) of the dog 504, according to one embodiment.

The auditory microphone installed in the dog leash 150A may play a soothing music (e.g., a tune, a melody) to pacify the dog 504, according to one embodiment. In another embodiment, the auditory microphone may emit a high pitched alarm (e.g., an alert tone) when an emergency condition is detected. The pedometer embedded in the dog leash 150A may notify to the mobile device 506 of the walker 502 regarding the distance covered, calories burned, steps taken, and/or the time of day walked, according to one embodiment.

Figure 6:
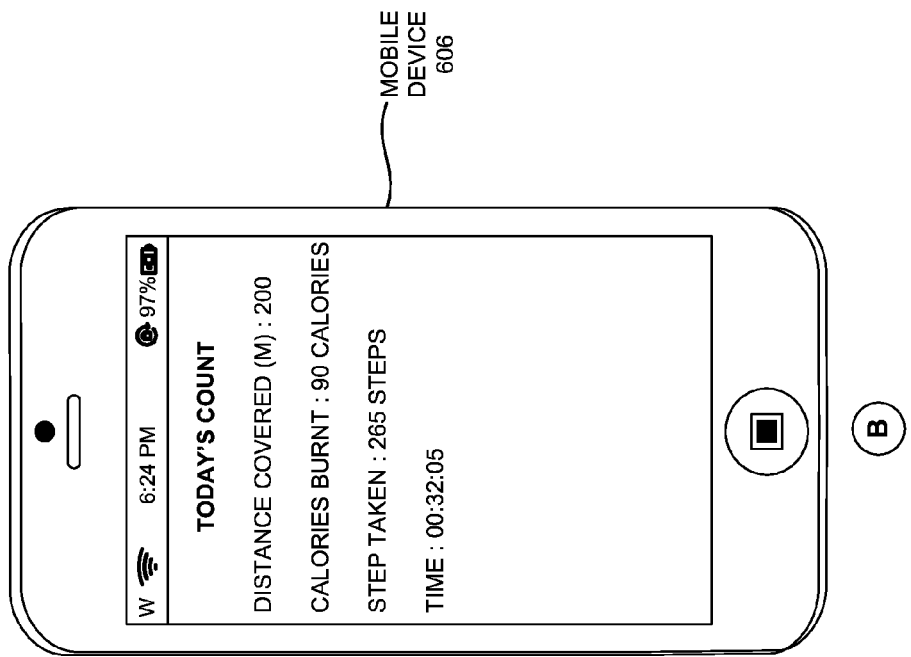
FIG. 6 is a user interface view of the mobile device displaying the data tracked by the pedometer embedded in the dog leash of FIG. 1A, according to one embodiment.
Figure 6:
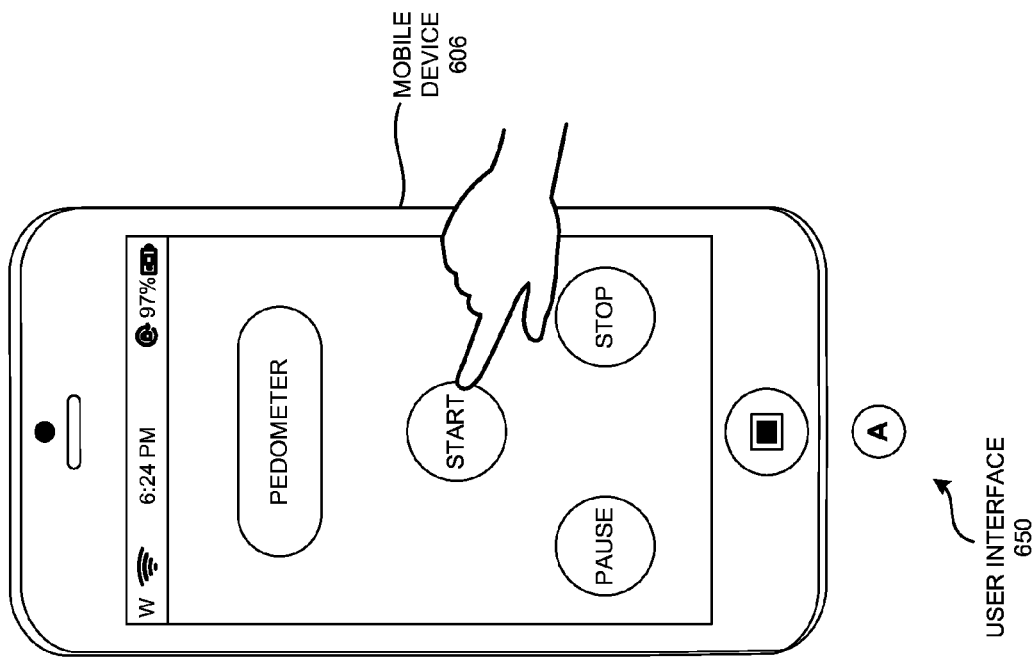

FIG. 6 is a user interface 650 displaying the data tracked by the pedometer 130 embedded in the dog leash 150A. In user interface A, the walker 202 may be able to pair the mobile device 606 with the pedometer 130 embedded in the dog leash 150A, according to one embodiment. User interface B may display the information tracked by the pedometer 130, according to one embodiment.

An example embodiment will now be described. Sharon may have arrived home from her busy schedule in the office. Sharon may want to take her dog Tuffy for a walk in the evening and/or night hours. Sharon may not feel like going to her daily walk due to number of challenges (e.g., crossing a busy road, poor lighting) that may pose threat to her and/or her dog Tuffy. Thankfully, one day, Sharon may have learned about the new features of the dog leash 150A (as described in the various FIGS. 1A-6) that may save her and her dog's life from the significant vehicular traffic and dim lighting conditions on the road in the evening hours. Sharon and Sharon's dog Tuffy may now enjoy the walk and feel safe. Also, Sharon may be notified about the distance traveled, steps taken, calories burnt, etc. on her mobile device that may provide additional benefits to her.

The various embodiments of the dog leash 150A of FIGS. 1A to 6 may secure, control, and/or restrain a dog being controlled by the walker (e.g., an owner of the dog, a friend of the owner, a professional caretaker, a pet lover), according to one embodiment. The embodiments of the dog leash 150A of FIGS. 1A to 6 may prove particularly advantageous against night visibility issues, according to one embodiment.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

A number of embodiments have been described. Nevertheless, it will be understood that various modifications may be made without departing from the spirit and scope of the claimed invention. Accordingly, other embodiments are within the scope of the following claims.

It may be appreciated that the dog leash disclosed herein may be manufactured and/or implemented using computing technology including software that is stored in a machine-readable medium and/or a machine accessible medium compatible with a data processing system (e.g., having a processor, a memory and a storage).

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A dog leash comprising:
a central cavity holding a retractable leash;
an extension sensor to detect when the retractable leash is extended beyond a threshold distance;
an ambient light sensor to detect a surrounding light intensity; and
a set of lights to automatically illuminate at least one of a dog being walked by a walker, a perpendicular area, and the walker when the extension sensor detects that the retractable leash is extended beyond the threshold distance when the ambient light sensor detects that a surrounding ambient light is below a threshold value using a processor and a memory of the dog leash.

2. The dog leash of claim 1:
wherein the threshold distance is 24 inches, and
wherein the threshold value is less than 120 lux (luminous flux per unit area).

3. The dog leash of claim 2 wherein the set of lights are configured to automatically turn off when the retractable leash has contracted under 12 inches.

4. The dog leash of claim 1 further comprising:
an agitation sensor to detect when the dog being walked by the walker is agitated, wherein the agitation sensor is at least one of a force sensor, a pressure sensor, a tension sensor, a motion sensor and an auditory sensor.

5. The dog leash of claim 4:
wherein the set of lights are configured to automatically create a pattern to soothe the dog when the dog being walked by the walker is agitated, wherein the pattern is at least one of a strobe pattern, a color pattern, and a light therapy pattern.

6. The dog leash of claim 5 further comprising:
an auditory microphone of the dog leash to emit at least one of a soothing music when the dog being walked is agitated, and a high pitched alarm when an emergency condition is detected, and
wherein the emergency condition is detected when at least one of the dog leash is detected to be unpredictably tangled and when the walker manually presses a button on the dog leash.

7. The dog leash of claim 6 further comprising:
a pedometer embedded within the dog leash that is communicatively coupled with the processor and the memory to capture data to track at least one of a walked distance, calories burned, steps taken, and a time of day walked,
wherein the pedometer is configured to wirelessly communicate the data to a mobile device of the walker when the dog leash is paired with the mobile device of the walker.

8. The dog leash of claim 7 further comprising:
a battery compartment of the dog leash to house any one of a rechargeable battery and an alkaline battery and to include a key chain holder on a top face of the battery compartment.

9. A dog leash comprising:
a central cavity holding a retractable leash;
an extension sensor to detect when the retractable leash is extended beyond a threshold distance;
an ambient light sensor to detect a surrounding light intensity;
a set of lights to automatically illuminate at least one of a dog being walked by a walker, a perpendicular area, and the walker when the extension sensor detects that the retractable leash is extended beyond the threshold distance when the ambient light sensor detects that a surrounding ambient light is below a threshold value using a processor and a memory of the dog leash; and
an agitation sensor to detect when the dog being walked by the walker is agitated, wherein the agitation sensor is at least one of a force sensor, a pressure sensor, a tension sensor, a motion sensor and an auditory sensor.

10. The dog leash of claim 9:
wherein the threshold distance is 24 inches, and wherein the threshold value is less than 120 lux (luminous flux per unit area).

11. The dog leash of claim 10 wherein the set of lights are configured to automatically turn off when the retractable leash has contracted under 12 inches.

12. The dog leash of claim 11:
wherein the set of lights are configured to automatically create a pattern to soothe the dog when the dog being walked by the walker is agitated, wherein the pattern is at least one of a strobe pattern, a color pattern, and a light therapy pattern.

13. The dog leash of claim 12 further comprising:
an auditory microphone of the dog leash to emit at least one of a soothing music when the dog being walked is agitated, and a high pitched alarm when an emergency condition is detected, and
wherein the emergency condition is detected when at least one of the dog leash is detected to be unpredictably tangled and when the walker manually presses a button on the dog leash.

14. The dog leash of claim 13 further comprising:
a pedometer embedded within the dog leash that is communicatively coupled with the processor and the memory to capture data to track at least one of a walked distance, calories burned, steps taken, and a time of day walked,
wherein the pedometer is configured to wirelessly communicate the data to a mobile device of the walker when the dog leash is paired with the mobile device of the walker.

15. The dog leash of claim 14 further comprising:
a battery compartment of the dog leash to house any one of a rechargeable battery and an alkaline battery and to include a key chain holder on a top face of the battery compartment.

16. A dog leash comprising:
a central cavity holding a retractable leash;
an extension sensor to detect when the retractable leash is extended beyond a threshold distance;
an ambient light sensor to detect a surrounding light intensity;
a set of lights to automatically illuminate at least one of a dog being walked by a walker, a perpendicular area, and the walker when the extension sensor detects that the retractable leash is extended beyond the threshold distance when the ambient light sensor detects that a surrounding ambient light is below a threshold value using a processor and a memory of the dog leash;
an agitation sensor to detect when the dog being walked by the walker is agitated, wherein the agitation sensor is at least one of a force sensor, a pressure sensor, a tension sensor, a motion sensor and an auditory sensor;
an auditory microphone of the dog leash to emit at least one of a soothing music when the dog being walked is agitated, and a high pitched alarm when an emergency condition is detected, and
wherein the emergency condition is detected when at least one of the dog leash is detected to be unpredictably tangled and when the walker manually presses a button on the dog leash.

17. The dog leash of claim 16:
wherein the threshold distance is 24 inches, and wherein the threshold value is less than 120 lux (luminous flux per unit area).

18. The dog leash of claim 17 wherein the set of lights are configured to automatically turn off when the retractable leash has contracted under 12 inches.

19. The dog leash of claim 18:
wherein the set of lights are configured to automatically create a pattern to soothe the dog when the dog being walked by the walker is agitated, wherein the pattern is at least one of a strobe pattern, a color pattern, and a light therapy pattern.

20. The dog leash of claim 19 further comprising:
- a pedometer embedded within the dog leash that is communicatively coupled with the processor and the memory to capture data to track at least one of a walked distance, calories burned, steps taken, and a time of day walked,
- wherein the pedometer is configured to wirelessly communicate the data to a mobile device of the walker when the dog leash is paired with the mobile device of the walker.

* * * * *